United States Patent Office 3,261,805
Patented July 19, 1966

3,261,805
POLYOXYMETHYLENE STABILIZED WITH
AROMATIC NITRO COMPOUNDS
Vivien Griffiths, Welwyn Garden City, and John Carswell McGowan, Harpenden, England, assignors to Imperial Chemical Industries Limited, London, England, a corporation of Great Britain
No Drawing. Filed Jan. 21, 1963, Ser. No. 252,555
Claims priority, application Great Britain, Jan. 30, 1962, 3,473/62
15 Claims. (Cl. 260—45.8)

This invention relates to compositions comprising high molecular weight oxymethylene polymers.

High molecular weight oxymethylene polymers are solid polymers in which more than 50 in every 100 units in the polymeric chain have the structure $-OCH_2-$. The preferred polymers contain at least 85 and generally at least 95 such units in every 100 units in the polymeric chain. These polymers are normally prepared by the polymerization or copolymerization of formaldehyde or one of its low polymers such as trioxane (which is the cyclic trimer of formaldehyde), paraformaldehyde or α-polyoxymethylene. The preparation of homopolyoxymethylene is described, for example, in British Patents 748,836 and 753,299 and the preparation of high molecular weight oxymethylene polymers containing other units in the polymeric chain is described in British Patents 807,589 (where formaldehyde is polymerized in the presence of preformed polymers to give block copolymers) and 903,668 which describes the copolymerization of trioxane with certain cyclic ethers.

The oxymethylene polymers as formed are generally terminated by a hydroxyl group at least at one end of the polymeric chain and sometimes at both, when they may be termed oxymethylene polymer glycols. These hydroxy-ended polymers are unstable to heat and on heating depolymerization occurs, starting from the end of the chain by what may be called an "unzipping" action. In the case of homopolyoxymethylenes, the polymer is ultimately completely decomposed. In the case of the oxymethylene copolymers the unzipping will halt generally when the first foreign unit in the chain is reached. In both the homopolymers and the copolymers, this "unzipping" may be prevented to a large extent by replacing the vulnerable hydroxyl end-groups of the chains by end-groups which are more stable, for example, carboxylate, ether or urethane end-groups. These may be formed by reacting the hydroxyl-ended polymers with, for example, acid anhydrides, alcohols, acetals, ethers, isocyanates or epoxides or by forming the polymer in the presence of a compound, such as an acid anhydride or an acetal, that will both act as a chain transfer agent and leave suitable end-groups terminating the polymer chains. Oxymethylene polymers containing these formed end-groups and those formed by the partial degradation of copolymers are also included in the term "high molecular weight oxymethylene polymers."

Oxymethylene polymers of the kind described may be degraded by autoxidative fission in which the polymer chains are ruptured at one or more intermediate points in their length. This may occur, for example, at elevated temperatures in an oxidizing atmosphere. Such conditions may be encountered during processing of the polymer or while it is being used in applications where its high softening point is utilized. It is an object of this invention to provide oxymethylene polymer compositions having a reduced tendency to degrade by autoxidative fission.

We have now found that if an oxymethylene polymer is mixed with one of a certain class of nitro compounds as stabilizer, its tendency to degrade (as shown by its tendency to embrittle at elevated temperatures) is substantially reduced.

According to the present invention we provide new polymeric compositions comprising a high molecular weight oxymethylene polymer together with a stabilizing amount of a stable aromatic nitro compound having a molecular weight greater than about 220.

By aromatic nitro compound, we mean any aromatic compound in which there is at least one $-NO_2$ (nitro) group directly attached to an aromatic carbon atom. Many aromatic nitro compounds having a molecular weight greater than 220 are explosives (examples are TNT and tetryl). The use of such unstable compounds in the present invention is not envisaged.

Aromatic nitro compounds of low molecular weight tend to be volatile and therefore unsuitable as additives to oxymethylene polymers for the purpose of stabilization but we have found that stable aromatic nitro compounds having a molecular weight greater than 220 are suitable additives and that oxymethylene polymer compositions containing these compounds show a surprising increase in resistance to embrittlement at elevated temperatures in an oxidizing atmosphere.

The effect of the presence of nitro groups may be demonstrated by the fact that a composition containing a polyoxymethylene together with 0.5% of N,N'-diphenyl urea becomes brittle after only 20 hours at 140° C. while a composition containing the same polyoxymethylene with 0.5% of N-2,4-dinitrophenyl-N'-phenyl urea will withstand 70 hours at that temperature before embrittlement. The effect of the presence of nitro groups is in general accumulative. For example, a composition containing a polyoxymethylene and 0.5% of p-nitrophenyl phenyl ether embrittles after 90 hours at 140° C. while a similar composition containing 0.5% of di(p-nitrophenyl) ether will withstand 360 hours before embrittlement.

It should be appreciated that the figure of 220 for molecular weight is to a large extent arbitrary and that there are one or two aromatic nitro compounds with a molecular weight of 220 or less which are sufficiently involatile to be of use in the compositions of this invention. For example, the 2,4-dinitrophenylhydrazone of formaldehyde (having a molecular weight of 210) is a useful component in our compositions. However, we have found that on the whole 220 represents a reasonable bottom limit for the molecular weight of the compounds.

Any stable aromatic nitro compound with a molecular weight of more than about 220 may be used in our compositions. Examples are substituted nitrobenzene, substituted nitronaphthalenes, substituted nitropyridines, substituted nitroquinolines, nitroanthracenes, nitrophenanthrenes, nitrochrysenes, the nitro substituted high aromatic compounds and their substituted derivatives. However, aromatic compounds containing fused ring structures, such as naphthalene, anthracene or chrysene nuclei, tend to be incompatible with oxymethylene polymers and we prefer, therefore, to use compounds containing nitro-substituted benzene rings.

Any suitable substituents may be used on the nitro-aromatic rings and examples are (1) Hydrocarbon radicals which may be saturated or unsaturated and may be alkyl, alkenyl, aryl, aralkyl, alkaryl or cycloalkyl;

(2) Substituted hydrocarbon radicals;

(3) Groups having the structure —XR where X is a carbonyl, sulphoxide or sulphone group or an oxygen or sulphur atom and R is hydrogen, a monovalent hydrocarbon radical or a substituted monovalent hydrocarbon radical;

(4) Groups having the structure —CO.OR or —O.CO.R where R has the same meaning as in (3) above;

(5) Groups having the structure

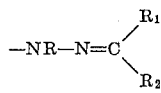

where R, $R_1$ and $R_2$ are each hydrogen, monovalent hydrocarbon radicals or substituted monovalent hydrocarbon radicals and may be the same or different, or where $R_1$ and $R_2$ may together form a divalent organic radical;

(6) Groups having the structure

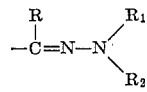

where R, $R_1$ and $R_2$ have the same meaning as in (5) above;

(7) Groups having the structure

where R, $R_1$ and $R_2$ have the same meaning as in (5) above;

(8) Groups having the structure

where $R_1$ and $R_2$ have the same meaning as in (5) above;

(9) Groups having the structure

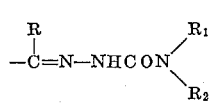

where R, $R_1$ and $R_2$ have the same meaning as in (5) above, and

(10) Groups having the structure

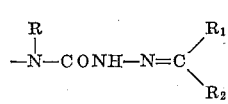

or

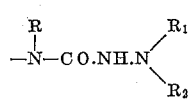

where R, $R_1$ and $R_2$ have the same meaning as in (5) above.

Examples of substituents of class (1) above are alkyl radicals such as methyl, ethyl, isopropyl, n-propyl, isobutyl, n-butyl, t-butyl, the isometric amyl radicals and higher alkyl radicals such as hexyl, heptyl, decyl, lauryl, stearyl and their isomeric and higher homologues; alkenyl radicals such as vinyl, propenyl, butenyl, isobutenyl, hexenyl, heptenyl, 2-methyl-but-1-enyl, 3-methyl-but-1-enyl, decenyl and their isomeric and higher homologues, aryl radicals such as the phenyl radicals and those derived from naphthalene, anthracene, chrysene, pyrene and their higher homologues; aralkyl radicals such as benzyl and xylyl radicals; alkaryl radicals such as tolyl, o-ethylphenyl, p-ethylphenyl, m-ethylphenyl, butylphenyl and other akylphenyl radicals and the naphthalene and anthracene homologues and cycloalkyl radicals such as cyclobutyl, 1,1,3,3-tetramethylcyclobutyl, cyclopentyl, cyclohexyl, 2-phenylcyclohexyl and cyclooctyl radicals.

Substituents for these monovalent hydrocarbon radicals include for example, halogen atoms, ether groups, carboxylate groups, amide groups, keto groups, amine and substituted amine groups (such as hydrazine, and urea groups) and the sulphur homologues of the oxygen-containing groups mentioned above.

The radicals of the structure R, $R_1$ and $R_2$ may be selected from the hydrocarbon radicals listed above and their substituted derivatives and hydrogen. $R_1$ and $R_2$ together may also form divalent organic radicals such as a polymethylene group or a group of the structure —$(CH_2)_n$—Z—$(CH_2)_m$ where $n$ and $m$ are positive integers and Z is a nitrogen, oxygen or sulphur atom or a ketone, sulphone or sulphoxide group. For example in groups 6, 7, 8, 9 and 10 above, the grouping

may form a piperidine, γ-pyridone or piperazine group.

Of the aromatic nitro compounds, we have found that those containing (apart from the nitro group) only carbon and hydrogen atoms are only moderately good stabilizers. On the other hand, we have found that an enhanced stabilizing effect is obtained if the aromatic nitro compound has at least one substituent having the structure —OR attached to a carbon atom of the nitrated aromatic nucleus. The compound may also have other substituents if desired. Of the ether substituents, we have found that those containing a hydroxyl radical or a carboxylate radical in the group attached to the nitro aromatic group by the ether linkage are particularly good. Examples of ethers are the ethyl-, propyl-, butyl-, phenyl-, nitrophenyl- and alkylphenyl-ethers of 2,4-dinitrobenzene, the hydroxy alkyl ethers of 2,4-dinitrobenzene and the esters of these hydroxy alkyl ethers such as the acetate and benzoate of β-hydroxyethyl 2,4-dinitrophenyl ether. Substituted derivatives of these aromatic nitro compounds in which the substituents are on the nitrated aromatic nucleus or on the ether group may also be used. Ethers of nitrobenzene and trinitrobenzene having suitable molecular weight may also be used.

We have also found that the presence of a group having the structure

attached to the carbon atom of a nitrated aromatic nucleus of our aromatic compounds enhances their effect as stabilizers, particularly where the nitrated aromatic nucleus contains a further group having an active hydrogen atom (e.g. a carboxylic acid group). Examples of our amines are nitro-aromatic compounds substituted in the aromatic nucleus by primary amines such as aniline, butylamine or cyclohexylamine or secondary amines such as piperazine and piperidine or the substituted derivatives of such amines. The nitro aromatic nucleus may also be substituted by other groups if desired. Particularly useful amines are 2-carboxy-4-nitro-4'-chloro diphenylamine and N-2,4-dinitrophenyl γ-pyridone.

The effect of the amine group is further enhanced if the amino nitrogen atom is joined to another nitrogen to form a group having the structure

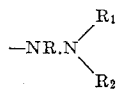

Very useful compounds are obtained where R is hydrogen and particularly where R is hydrogen and $R_1$ and $R_2$ are aromatic radicals. Examples are N,N-diphenyl-N'-nitrophenylhydrazines and their substituted derivatives, particularly N,N-diphenyl-N'-2,4,6-trinitrophenylhydrazine.

Other aromatic nitro compounds having two nitrogens linked together which we have found to give good results as stabilizers in our compositions are those containing the groups having the structure (5) and (6) as set out above. Our preferred groups of compounds are the hydrazones, particularly the phenylhydrazones which may be phenylhydrazones of nitro-substituted aromatic aldehydes and ketones or nitro-substituted-phenylhydrazones of any aldehydes and ketones. In the latter case, the aldehyde or ketone may also include as nitro-aromatic residue if desired.

Phenylhydrazones may be said to have the general structure

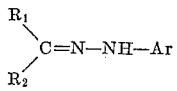

where $R_1$ and $R_2$ are each selected from the group consisting of hydrogen, monovalent hydrocarbon radicals and substituted monovalent hydrocarbon radicals or may together form a divalent organic radical and Ar is a phenyl or substituted phenyl radical. In our specified phenyl hydrazones, the nitro group may be on the phenyl, or substituted phenyl, radical or on a benzene ring which may be represented by or form part of $R_1$ or $R_2$.

Where the nitro group is on the radical -Ar, we have found that the preferred compounds are those in which $R_1$ and $R_2$ are both phenyl or substituted phenyl radicals. In general, in our specified nitrophenylhydrazones such a radical is better than a hydrogen atom which is better than an alkyl radical. Thus the 2,4-dinitrophenylhydrazone from benzophenone is a better stabilizer in our oxymethylene polymer compositions than that from benzaldehyde which is better than that from formaldehyde or acetone.

As in the case of the ethers, we have found that substitution in the hydrazone has a marked effect on its usefulness in our compositions. Particularly useful compounds are those in which the aldehydes or ketones from which the nitrophenylhydrazones are derived contain alkoxy-substituted benzene rings.

Another group of particularly useful nitrophenylhydrazones are those derived from aldehydes and ketones containing alpha unsaturation. Such phenylhydrazones contain the conjugated unsaturated linkage

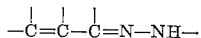

Examples of phenylhydrazones that may be used are the nitrophenylhydrazones (e.g. the 2,4-dinitrophenylhydrazones) derived from aldehydes such as formaldehyde, acetaldehyde, propionaldehyde, butyraldehyde, isobutyraldehyde, hexaldehyde, heptaldehyde, hexahydrobenzaldehyde, 2-phenyl-hexahydrobenzaldehyde, 2-chloro-hexahydrobenzaldehyde, isovaleraldehyde, n - octylaldehyde, benzaldehyde, vanillin, anisaldehyde, and veratric aldehyde; ketones such as cyclopentanone, cyclohexanone, acetone, methyl ethyl ketone, methyl-n-amyl ketone; acetophenone, benzophenone and p,p'dimethoxy-benzophenone; unsaturated aldehydes such as cinnamaldehyde and crotonaldehyde and unsaturated ketones such as mesityl oxide and α-methyl-β-ethyl-acrolein and phenylhydrazones of the isomeric nitrobenzaldehydes, nitro-substituted benzophenones and nitro-substituted-phenyl alkyl ketones, such as m-nitrophenyl methyl ketone. m-Nitrobenzaldehyde phenylhydrazone and p-nitrobenzaldehyde phenylhydrazone are very useful stabilizers in our compositions. Substituted derivatives of all these compounds may also be used.

Nitro-aryl substituted ureas are also very useful in our compositions. These compounds may be said to have the general structure

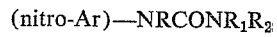

where (nitro-Ar) is a nitro substituted aromatic group optionally containing other substituents, preferably a nitrophenyl, or substituted nitrophenyl, group and R, $R_1$ and $R_2$ are hydrogen or monovalent hydrocarbon or substituted monovalent hydrocarbon derivatives which may be the same or different or $R_1$ and $R_2$ may together form a divalent organic radical.

Of the nitro-aromatic ureas, we prefer the nitrophenyl or substituted nitrophenyl ureas because they may be prepared from readily available materials. We particularly prefer those in which R is hydrogen. The nitrophenyl radicals may contain one, two or more nitro groups, as well as other substituents if desired.

Unlike the phenylhydrazones, we find that the effectiveness of the ureas as stabilizers in our compositions is greater when $R_1$ and $R_2$ are alkyl groups or $R_1$ and $R_2$ together form a polymethylene divalent radical. These ureas are generally better than their equivalents in which $R_1$ and $R_2$ are hydrogen atoms or aryl groups. However, the presence of aryl groups containing carboxylic acid, nitro, acyl or halogen substituents has a very beneficial effect on the stabilizing effect of the compounds.

Surprisingly useful compositions are obtained when the nitrophenyl urea has the structure

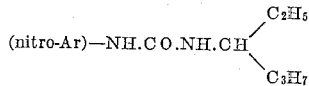

Other very effective ureas are those having the structure (nitro-Ar)—$NR.CO.NR_1$—$NO_2$, such as N-2,4-dinitrophenyl-N'-nitrourea.

Examples of nitrophenyl ureas are nitrophenyl-, dinitrophenyl- and trinitrophenyl-ureas in which R and $R_1$ are hydrogen and $R_2$ is a propyl, isopropyl, butyl, amyl, hexyl, cyclohexyl, phenyl, p-tolyl, morpholino, nitro, p-carboxyalkyl, phenyl, acetyl, p-acetylaminophenyl, o-nitrophenyl, m-nitrophenyl, p-nitrophenyl or halogen-substituted phenyl radical; R is hydrogen, $R_1$ is a phenyl and $R_2$ is an alkyl radical or R is hydrogen and $R_1$ and $R_2$ are both phenyl or alkyl radicals, or their substituted derivatives. Aromatic nitro compounds containing two or more substituted urea groups are very effective, particularly those having the structure

where R' is a divalent hydrocarbon radical. An example is 2,4-dinitrophenyl-(1,2-ethylene di-urea).

Ureas in which the nitro aromatic group is not directly linked to a nitrogen atom of the urea group may also be used and those in which it is linked to the nitrogen atom via an ester group of the structure —COOQ—, where Q is a divalent aliphatic hydrocarbon radical, have been found to be very effective. Those compounds in which Q is an alkylene radical are readily obtainable and an example is N,N'-bis(β-p-nitrobenzoyloxy ethyl) urea.

Derivatives of our ureas in which one of the urea nitrogen atoms is linked to a further nitrogen atom are also particularly effective and examples are the semicarbazones and semicarbazides, containing the groups (9) or (10) above.

Examples of compounds having the structure (10) are nitrophenyl semicarbazones of aldehydes and ketones such as acetone, methyl ethyl ketone, methyl butyl ketone, methyl n-hexyl ketone, cyclopentanone, cyclohexanone, benzophenone, acetophenone, formaldehyde, acetaldehyde, valeraldehyde, hexahydrobenzaldehyde, n-heptaldehyde, benzaldehyde, anisaldehyde, veratric aldehyde, vanillin and cinnamaldehyde and nitrophenyl semicarbazides. We prefer the nitro-phenyl semicarbazones derived from aromatic ketones or aromatic aldehydes because of their very useful activity as stabilizers. Examples of compounds having the structure (9) that may be used are those in which the nitro aromatic group is in the aldehyde or ketone from which the semicarbazones are derived. Typical examples are the nitrobenzaldehyde semicarbazones containing one or more nitro groups; m-nitrobenzaldehyde semicarbazone and p-nitrobenzaldehyde semicarbazone are very good.

Another very useful group of nitro-aromatic stabilizers are the nitrobenzoates. These are particularly preferred because of their ready availability and effectiveness combined with their moderate cost. We have found that increase in the number of nitrobenzoate radicals present in the stabilizers increases their effectiveness and therefore we particularly prefer the poly(nitrobenzoates) of polyhydroxylic compounds such as, for example, glycol, polymethylene glycols, glycerol, erythritol, pentaerythritol, arabitol, mannitol and the products of reacting two or more moles of a phenol or substituted phenol with one mole of a dialdehyde, unsaturated aldehyde, phenol-substituted aldehyde, diketone, unsaturated ketone or phenol-substituted ketone. An example of such a product is the product of reacting three moles of 3-methyl-6-tertiary butyl phenol with one mole of crotonaldehyde. Substituted derivatives of these nitrobenzoates may also be used in which the substituents are on the nitrobenzoate radical or on the hydroxylic compound.

Yet another useful group of compounds are the products of reacting aldehydes with nitro-substituted anilines or their substituted derivatives; an example is the condensation product of furfural and p-nitro-aniline, believed to have the structure 2-p-nitroanilino-3-keto-N-(p-nitrophenyl)-1,2,3,6-tetrahydropyridine.

From a study of the toxic effect on living cells of a very large number of compounds which may be regarded as having only a physically toxic effect and no chemically toxic effect, it has been found that the presence of each group of atoms in the molecule of any compound has a definite and substantially unvaried effect upon the toxicity of the compound (see, for example, Journal of Applied Chemistry, 1, 1951, pages S120–S126, and the article "Physically Toxic Chemicals and Industrial Hygiene," American Medical Association Archives of Industrial Health, vol. 11, No. 4, April 1955, pages 315–323). Thus a measure of the toxicity of the compound may be deduced from a knowledge of its molecular structure, each group of atoms in the molecule being associated with a particular effect on the toxicity of the compound.

The effect is measured by totalling all the functions "$f$" associated with each group of atoms in the molecule.

There are two expressions for calculating the physical toxicity of an organic compound. One expression relates the toxicity to $\Sigma f$ (the sum of all the functions $f$ associated with the atomic groupings in the molecule); the other relates the toxicity to the vapor pressure "$p$" of the compound. By combining the two expressions and eliminating the toxicity function an expression may be obtained relating the vapor pressure of the compound to $\Sigma f$.

The expression may be simplified to $\log_{10} p = \Sigma(f - 0.0014P)$ to a first approximation, where $p$ is the vapor pressure, $\Sigma f$ is the sum of the functions of the atomic groupings and $\Sigma P$ is the parachor of the compound.

We have found that there is a relationship between the effectiveness of any stable aromatic nitro compound as a stabilizer in an oxymethylene polymer composition and the function: $\Sigma(f - 0.0014P)$ which is a measure of the vapor pressure of that compound.

Any of our specified nitro compounds may be regarded as derivatives of a simple molecule such as ethane or benzene and may be regarded as being formed by the substitution of the hydrogen atom in these simple molecules by other groups, the substitution being carried out step by step until the desired compound is attained. Thus, the compound N-n-propyl-2,4-dinitro aniline may be regarded as being derived from benzene by the following steps:

(i) Benzene with the substitution of a C—H group by a C—CH$_3$ group to give toluene.

(ii) Toluene with the substitution of a C—H group in the —CH$_3$ radical by a —C—CH$_3$ group to give ethyl benzene.

(iii) Ethyl benzene with the substitution of a C—H group in the —CH$_3$ radical by a —C—CH$_3$ group to give n-propyl benzene and repeat the process to give n-butyl benzene.

(iv) n-Butyl benzene with the substitution of a —C—H group in the n-butyl radical by a N atom to give N-n-propyl aniline.

(v) N-n-propyl aniline with the substitution of two nuclear —C—H groups by —C—NO$_2$ groups to give N-n-propyl-2,4-dinitroaniline.

From the table at the end of the examples, the function $\Sigma(f - 0.0014P)$ for N-n-propyl-2,4-dinitroaniline may be calculated as $3.86 - (4 \times 0.4) - 0.73 - (2 \times 2.5) = -3.47$.

While there appears to be little correlation between this function and the usefulness of the compounds as stabilizers down to a value for the function of about $-10$, we have found that stable aromatic nitro compounds having a function as hereinbefore defined of less than about $-10$ are always very useful stabilizers in our oxymethylene polymer compositions and therefore as a preferred embodiment of our invention we provide oxymethylene polymer compositions of improved stability against degradation at elevated temperature in an oxidative atmosphere comprising a high molecular weight oxymethylene polymer and a stable aromatic nitro compound having a molecular weight of at least 220 and a value for the function $\Sigma(f - 0.0014P)$ as hereinbefore defined of less than $-10$.

The amount of aromatic nitro compound used in the compositions will not normally exceed 5% by weight of the oxymethylene polymer and it is preferred to use between 0.5 and 1%. While amounts below 0.5% may be used if desired, less than 0.05% is generally insufficient in its effect. The use of more than 1% is uneconomical.

The compositions may be formed by any convenient method in which intimate mixing is effected. For example, the solid polymer may be compounded with the stabilizer or may be dissolved and the stabilizer dispersed or dissolved in the solution. Suitable solvents include p-chlorophenol, benzyl alcohol and dimethyl formamide. The polymer may also be melted in vacuo or under an atmosphere of inert gas and the stabilizer thoroughly stirred into the melt.

Other common additives such as pigments, fillers (e.g. fibrous glass), plasticizers, mold-release agents, lubricants, ultra-violet light screening agents and other stabilizers (such as phenols, ureas, thioureas, hydrazines; hydrazides and the like) may be added to our compositions and the compositions may be molded, cast into films and sheets or spun into fibers.

Our invention is illustrated by the following examples in which all parts are expressed as parts by weight.

In each of the examples, a sample was prepared by milling 100 parts of a copolymer comprising 98.5 mole percent of oxymethylene units and 1.5 mole percent of oxyethylene units with 0.5 part of the selected aromatic nitro compound at 165–170° C. The compositions were pressed at 170° C. into sheets of about 0.020 inch thickness.

Sections measuring about 1.0 x 1.0 inch obtained from these sheets were placed in a circulating air oven at 140°

C. and the times were recorded at which the samples first became brittle, as measured by a manual flex test.

In all the examples, the toxicity functions of the aromatic nitro compounds were calculated from the table set out after the examples.

The following three examples demonstrate the use of nitro-aromatic compounds consisting only of carbon and hydrogen atoms (other than in the nitro group).

| Example | Additive | Function $\Sigma(f-0.0014P)$ | Time to embrittlement (hours) |
|---|---|---|---|
| Test | Nil | | <4 |
| 1 | p-Nitro-n-dodecylbenzene [1] | -3.4 | 20 |
| 2 | 9-nitroanthracene [2] | -2.9 | 20 |
| 3 | Trinitro-p-xylene [3] | -4.4 | 45 |

[1] Prepared in the manner similar to that described in "Organic Syntheses" Collective Volume 3, p. 653.
[2] Prepared by the method described in "Organic Synthesis" Vol. 31, p. 77.
[3] Prepared by the method described by Fittig and Glinzer (Liebig's Annalen, 136, 308, 1865).

The next six examples demonstrate the use of nitro-aromatic ethers.

| Example | Additive | Function $\Sigma(f-0.0014P)$ | Time to embrittlement (hours) |
|---|---|---|---|
| Test | Nil | | <4 |
| 4 | 2,4-dinitrophenetole [1] | -2.2 | 50 |
| 5 | 2,4-dinitro-4'-($\alpha,\alpha,\gamma,\gamma$-tetramethyl butyl) diphenyl ether [1] | -7.5 | 65 |
| 6 | 2,4-dinitro-diphenyl ether [1] | -4.25 | 90 |
| 7 | 2,4-dinitrophenyl-$\beta$-hydroxyethyl ether [2] | -3.6 | 115 |
| 8 | Acetate of 7 [2] | -4.1 | 265 |
| 9 | Benzoate of 7 [2] | -6.5 | 430 |

[1] These compounds were prepared by the method described by Radford and Colbert in the Journal of the American Chemical Society 48, 2652, 1926.
[2] Prepared by the process described by Blanksma and Fahr (Rec. trav., chim. des Pays-Bas, 65, 719, 1946).

*Example 10*

The effect of an additional nitro group is demonstrated by repeating Example 6 using 2,4,4'-trinitrodiphenyl ether (toxicity function −6.75). The time to embrittlement of the sample was 360 hours. The nitro compound was prepared by the method described by Radford and Colbert in the Journal of the American Chemical Society 48, 2652, 1926.

Examples 11 to 19 demonstrate the use of amino-nitro-aromatic compounds as stabilizers in oxymethylene compositions.

| Example | Additive | Function $\Sigma(f-0.0014P)$ | Time to embrittlement (hours) |
|---|---|---|---|
| Test | Nil | | <4 |
| 11 | 2,4-dinitrodiphenylamine | -5.0 | 40 |
| 12 | N-(2,4-dinitrophenyl)-n-nonylamine [1] | -5.9 | 45 |
| 13 | 1-nitro-2-acetylamino naphthalene | -4.1 | 50 |
| 14 | N-methyl-2,4-dinitrodiphenylamine [1] | -5.5 | 65 |
| 15 | 2,4-dinitrophenyl urethane | -4.5 | 70 |
| 16 | Condensation product of p-nitroaniline and furfuraldehyde [2] | | 530 |
| 17 | N,N'-di(2,4-dinitrophenyl)-2,5-dimethylpiperazine [1] | -13.7 | 575 |
| 18 | N-(2,4-dinitrophenyl)-$\gamma$-pyridone | | >1,200 |
| 19 | 2-carboxy-4-nitro-4'-chlorodiphenylamine | | 1,415 |

[1] Prepared by the process described by Radford and Colbert, Journal of the American Chemical Society, 48, 2652, 1926.
[2] The condensation product of p-nitroaniline and furfuraldehyde was prepared according to J. Rombank and G. Smets (Bull. Soc. Chim. Belg. Vol. 58, No. 427, 1949) but was found to have a melting point of 207° C. instead of 260° C. given in the literature. The structure is not certain but is probable 2-p-nitro-anilino-3-keto-N-(p-nitrophenyl)-1,2,3,6-tetrahydropyridine.

Examples 20 to 29 demonstrate the use of amino-nitro-aromatic compounds in which the amino-nitrogen atom is attached to a further nitrogen atom. The phenylhydrazones, p-nitrophenylhydrazones and 2,4-dinitrophenyl hydrazones were prepared as described in "A Textbook of Organic Chemistry" by A. I. Vogel, 3rd edition, 1956 at pages 721, 722 and 344 respectively.

| Example | Additive | Function $\Sigma(f-0.0014P)$ | Time to embrittlement (hours) |
|---|---|---|---|
| Test | Nil | | <4 |
| 20 | $\alpha,\alpha$-Diphenyl-$\beta$-picryl hydrazine [1] | -11.5 | 1,130 |
| 21 | Benzaldehyde p-nitrophenylhydrozone | -4.0 | 890 |
| 22 | m-Nitrobenzaldehyde phenylhydrazone | -4.0 | 505 |
| 23 | p-Nitrobenzaldehyde phenylhydrazone | -4.0 | 890 |
| 24 | Methyl n-amyl ketone 2,4-dinitrophenyl hydrazone | -6.1 | 45 |
| 25 | n-Heptaldehyde 2,4-dinitrophenylhydrazone | -6.1 | 45 |
| 26 | Cyclopentanone 2,4-dinitrophenylhydrazone | | 50 |
| 27 | Isobutyraldehyde 2,4-dinitrophenylhydrazone | -4.9 | 100 |
| 28 | Hexahydrobenzaldehyde 2,4-dinitrophenylhydrazone | -6.2 | 170 |
| 29 | 2-phenylcyclohexanone-2,4-dinitrophenylhydrazone | -8.6 | 360 |

[1] Prepared by the method described by Poirier, Koller and Benington (J. Org. Chem. 17, 1437, 1952).

Examples 30 to 34 demonstrate the effect of the presence of hydrogen, alkyl and aryl groups in the aldehyde or ketone on the usefulness of 2,4-dinitrophenyl hydrazones as stabilizers.

| Example | Additive | Function $\Sigma(f-0.0014P)$ | Time to embrittlement (hours) |
|---|---|---|---|
| 30 | Acetone 2,4-dinitrophenylhydrazone | -4.5 | 30 |
| 31 | Formaldehyde 2,4-dinitrophenylhydrazone | -3.7 | 145 |
| 32 | Acetophenone 2,4-dinitrophenylhydrazone | -6.9 | 145 |
| 33 | Benzaldehyde 2,4-dinitrophenylhydrazone | -6.5 | 190 |
| 34 | Benzophenone 2,4-dinitrophenylhydrazone | -9.3 | 260 |

The following examples demonstrate the marked effect of an ether substituent on the use of the phenylhydrazone of benzaldehyde as a stabilizer.

| Example | Additive | Function $\Sigma(f-0.0014P)$ | Time to embrittlement (hours) |
|---|---|---|---|
| 33 | Benzaldehyde 2,4-dinitrophenylhydrazone | -6.5 | 190 |
| 35 | Anisaldehyde 2,4-dinitrophenylhydrazone | -7.2 | 840 |
| 36 | Varatric aldehyde 2,4-dinitrophenylhydrazone | -7.9 | >865 |
| 37 | Vanillin 2,4-dinitrophenylhydrazone | -8.6 | >865 |

*Example 38*

Example 34 was repeated using p,p'-dimethoxy benzophenone-2,4-dinitrophenylhydrazone (function −10.7) in place of benzophenone-2,4-dinitrophenylhydrazone. The time to embrittlement of the sample was 1325 hours, thus showing the marked effect of using an alkoxy phenyl ketone.

Examples 39 to 41 demonstrate the marked effect of using phenylhydrazones derived from aldehydes or ketones containing $\alpha$-unsaturation.

| Example | Additive | Function $\Sigma(f-0.0014P)$ | Time to embrittlement (hours) |
|---|---|---|---|
| 39 | Mesityl oxide 2,4-dinitrophenylhydrazone. | −5.7 | 335 |
| 40 | α-Methyl-β-ethyl-acrolein 2,4-dinitrophenylhydrazone. | −5.7 | 335 |
| 41 | Cinnamaldehyde 2,4-dinitrophenylhydrazone. | −7.1 | 815 |

The following examples demonstrate the use of nitroaryl ureas as stabilizers in our compositions.

| Example | Additive | Function $\Sigma(f-0.0014P)$ | Time to embrittlement (hours) |
|---|---|---|---|
| 42 | N-phenyl-N-methyl-N'-p-nitrophenyl urea.[1] | −5.9 | 65 |
| 43 | N-acetyl-N'-p-nitrophenyl urea.[1] | −4.9 | 95 |
| 44 | N-p-tolyl-N'-p-nitrophenyl urea.[1] | −5.9 | 95 |
| 45 | N,N-diphenyl-N'-p-nitrophenyl urea.[1] | −8.3 | 140 |
| 46 | N-p-acetylaminophenyl-N'-p-nitrophenyl urea.[1] | −7.7 | 145 |
| 47 | N-p-carboxyethylphenyl-N'-p-nitrophenyl urea.[1] | −7.8 | 240 |
| 48 | N-(2-nitro-4-chlorophenyl-carbamoyl)-N'-isopropyl guanidine. | --------- | 360 |
| 49 | N,N'-di(p-nitrophenyl)-urea.[1] | −8.0 | 360 |
| 50 | N-2,4-dichlorophenyl-N'-p-nitrophenyl urea.[1] | −7.1 | 360 |
| 51 | N-m-nitrophenyl-N'-p-nitrophenyl urea.[1] | −8.0 | 385 |
| 52 | N-p-acetylphenyl-N'-p-nitrophenyl urea.[1] | −7.7 | 480 |
| 53 | N-phenyl-N-nonyl-N'-p-nitrophenyl urea.[1] | −9.5 | 505 |
| 54 | N-p-carboxyphenyl-N'-p-nitrophenyl urea.[1] | --------- | 625 |

[1] These compounds were prepared by the process described by F. Wild in "Characterisation of Organic Compounds" Cambridge, 1958 at page 223.

The following 7 examples show the use of dinitrophenyl ureas as stabilizers in our compositions.

| Example | Additive | Function $\Sigma(f-0.0014P)$ | Time to embrittlement (hours) |
|---|---|---|---|
| 55 | N-phenyl-N'-2,4-dinitrophenyl urea.[1] | −7.6 | 70 |
| 56 | N-cyclohexyl-N'-2,4-dinitrophenyl urea.[1] | −7.3 | 170 |
| 57 | N-isopropyl-N'-2,4-dinitrophenyl urea.[1] | −6.0 | 220 |
| 58 | N-(2,4-dinitrophenyl-carbamoyl)-morpholine.[1] | --------- | 220 |
| 59 | 2,4-dinitrophenyl double urea of ethylene diamine. | --------- | 765 |
| 60 | N-(α-ethyl-n-butyl)-N'-2,4-dinitrophenyl urea. | --------- | 1,250 |
| 61 | N-nitro-N'-2,4-dinitrophenyl urea.[1] | --------- | >865 |

[1] Made by the process described by (Miss) J. L. McVeigh and J. D. Rose in the Journal of the Chemical Society, 621, 1945.

Examples 62 to 66 demonstrate the use of semicarbazides and semicarbaxones as stabilizers in or compositions.

| Example | Additive | Function $\Sigma(f-0.0014P)$ | Time to embrittlement (hours) |
|---|---|---|---|
| 62 | 2,4-dinitrophenyl semicarbazide [1]. | −6.4 | 95 |
| 63 | Methyl-n-hexyl ketone-2,4-dinitrophenyl semicarbazone.[1] | −9.5 | 170 |
| 64 | Benzaldehyde 2,4-dinitrophenyl semicarbazone.[1] | −9.5 | 505 |
| 65 | p-Nitrobenzaldehyde semicarbazone.[2] | −4.2 | 840 |
| 66 | m-Nitrobenzaldehyde semicarbazone.[2] | −4.2 | 910 |

[1] Prepared by the method described by (Miss) J. L. McVeigh and J. D. Rose in the Journal of the Chemical Society, 713, 1945.
[2] Prepared by the method described in "A Textbook of Practical Organic Chemistry" by A. I. Vogel, Third Edition, 1956 on p. 344.

The following four examples demonstrate the use of nitrobenzoates as stabilizers in our compositions. The compounds were made by the process described in "A Textbook of Practical Organic Chemistry" by A. I. Vogel, third edition 1956, at p. 263.

| Example | Additive | Function $\Sigma(f-0.0014P)$ | Time to embrittlement (hours) |
|---|---|---|---|
| 67 | 2-phenoxyethanol-p-nitrobenzoate (M.P. 63.5° C.). | −4.0 | 20 |
| 68 | o-Phenyl phenol-p-nitrobenzoate (M.P. 132.5° C.). | −5.7 | 70 |
| 69 | m-Trifluoromethylphenyl-p-nitrobenzoate. | --------- | 145 |
| 70 | The condensation product of p-nitrobenzoyl chloride and the compound derived from the condensation of 3 moles of 3-methyl-6-t-butyl phenol with one mole of crotonaldehyde. | −29.7 | >525 |
| 71 | N,N'bis(β-[p-nitrobenzoyloxy]-ethyl urea). | −12.6 | 1,950 |

Examples 72 to 80 show the use of 3,5-dinitrobenzoates as stabilizers in our compositions. The compounds were made by the process described in "A Textbook of Practical Organic Chemistry" by A. I. Vogel, third edition, 1956, at page 682.

| Example | Additive | Function $\Sigma(f-0.0014P)$ | Time to embrittlement (hours) |
|---|---|---|---|
| 72 | n-Butyl 3,5-dinitrobenzoate. | −4.25 | 25 |
| 73 | Methyl 3,5-dinitrobenzoate. | −3.05 | 50 |
| 74 | n-Dodecyl 3,5-dinitrobenzoate. | −7.45 | 90 |
| 75 | 2-phenoxyethanol 3,5-dinitrobenzoate. | −6.5 | 290 |
| 76 | Decamethylene glycol di(3,5-dinitrobenzoate).[1] | −16.0 | 1,010 |
| 77 | The tri(3,5-dinitrobenzoate) of the compound derived from the condensation of 3 moles of 3-methyl-6-t-butyl phenol with one mole of crotonaldehyde.[2] | −37.2 | 1,460 |
| 78 | Erthritol tetra (3,5-dinitrobenzoate).[3] | −32.1 | >1,200 |
| 79 | Pentaerythritol (3,5-dinitrobenzoate).[4] | −32.5 | >1,200 |
| 80 | Resorcinol di(3,5-dinitrobenzoate).[5] | −14.7 | >1,200 |

[1] Analysis of this compound gave a nitrogen content of 9.6%. $C_{24}H_{26}N_4O_{12}$ requires a theoretical nitrogen content of 10%. The melting point of the compound was 114° C.
[2] Believed to be the tri(3,5-dinitrobenzoate) of 1,1,2(or 3),-tris(2-methyl-4-hydroxy-5-t-butyl phenyl) butane. Analysis of the compound gave a nitrogen content of 6.9%. $C_{58}H_{58}N_6O_{18}$ requires a theoretical nitrogen content of 7.5%. The melting point of the compound was 160° C.
[3] Analysis gave a nitrogen content of 12.3%. $C_{32}H_{18}N_8O_{24}$ requires a theoretical nitrogen content of 12.4%. The melting point of the compound was 263° C.
[4] Analysis gave a nitrogen content of 11.7%. $C_{33}H_{20}N_8O_{24}$ requires a theoretical nitrogen content of 12.3%. The melting point of the compound was 249° C.
[5] Analysis gave a nitrogen content of 10.8%. $C_{20}H_{10}N_4O_{12}$ requires a theoretical nitrogen content of 11.2%. The melting point of the compound was 255° C.

*Example 81*

A composition containing 0.5% by weight of the oxymethylene polymer of dinitrobenzil, prepared by the method described by Chattaway and Coulson (J. Chem. Soc., 1926, 1070), embrittled after 140 hours at 140° C. in a circulating air oven. The same composition without the nitro-compound embrittled after less than four hours.

*Example 82*

A composition containing 0.5% by weight of the oxymethylene polymer of nitroanthrone embrittled after 95 hours at 140° C. in a circulating air oven. The same composition without the nitro-compound embrittled after less than four hours.

*Example 83*

A composition containing 0.5% by weight of the oxymethylene polymer of chloromycetin embrittled after 265 hours at 140° C. in a circulating air oven. The same composition without the nitro-compound embrittled after less than four hours.

TABLE OF FUNCTIONS f−0.0014P FOR CALCULATING Σ(f−0.0014P)

| Compound | f−0.0014P |
|---|---|
| Ethane | 5.87 |
| Cyclohexane | 4.14 |
| Benzene | 3.86 |
| Naphthalene | 1.73 |
| Substitution of— | |
| C=C by CH—CH | −0.1 |
| C—C by C—O—C | −0.3 |
| C—H by C—CH₃ | −0.4 |
| C—C by C—CH₂—C | |
| C—H by C—Cl | −0.79 |
| C—H by N(amine) | −0.73 |
| C—C by C—S—C | −1.23 |
| C—H by C—Br | −1.3 |
| C—H by C—OH | −1.4 |
| C—C by C—O—C̈—C (with =O) | −1.5 |
| C—H by C—I | −1.8 |
| C—H by CHO | −1.8 |
| C—C by C—CO—C | |
| C—H by C—CN | −2.2 |
| C—H by C—NO₂ | −2.5 |
| C—H by C—C₆H₅ | −2.8 |
| C—C by C—O—CNHC (with =O) | −3.4 |
| C—C by —C—NHCONHC— | −4.1 |

We claim:
1. A composition comprising a high molecular weight oxymethylene polymer and 0.05% to 5% by weight of the polymer of an aromatic compound having a molecular weight of at least 220 and containing at least one nitro group attached to a carbon atom of the aromatic nucleus and at least one other monovalent radical attached to another carbon atom of the same aromatic nucleus, where the aromatic nitro compound is selected from the group consisting of those of the formulae:

[(Nitro-Ar)—CO—O]ₙR
(Nitro-Ar)—NXY
(Nitro-Ar)—CH=N—NH—Z in which:

(Nitro-Ar) is a nitrated monovalent benzene radical;
R is the residue of a polyhydroxyl compound containing 2 to 4 hydroxyl groups;
n is 2 to 4;
X and Y together with the nitrogen atom form a six-membered heterocyclic ring or X is hydrogen and Y is selected from the group consisting of halogen-substituted phenyl, diphenylamino, N-(benzylideneimino) carbamoyl, N-nitrocarbamoyl, and

—CO—NH—A wherein A is selected from the group consisting of carboxyphenyl, acetylphenyl, nitro-substituted phenyl, halogen-substituted phenyl, secondary alkyl groups of the formula CHR¹R²
where R¹ and R² are each alkyl groups containing at least 2 carbon atoms,
and alkylene radicals;
the second valence of which is satisfied with a further group of the formula —NH—CO—NH—(Nitro-Ar)

And Z is selected from the group consisting of phenyl and carbamoyl.

2. A composition according to claim 1 in which the oxymethylene polymer contains at least 85 units of the structure —OCH₂— in every 100 units in the polymer chain.

3. A composition according to claim 1 in which the oxymethylene polymer contains oxyethylene units in the polymer chain.

4. A composition comprising a high molecular weight oxymethylene polymer and 0.05% to 5% by weight of the polymer of an aromatic compound having a molecular weight of at least 220 and containing at least one nitro group attached to a carbon atom of the aromatic nucleus and at least one other monovalent radical attached to another carbon atom of the same aromatic nucleus, where the aromatic nitro compound is selected from the group consisting of those of the formula:

[(Nitro-Ar)—CO—O—]ₙR in which:

(Nitro-Ar) is a nitrated monovalent benzene radical;
R is the residue of a polyhydroxyl compound containing 2 to 4 hydroxyl groups;
n is 2 to 4.

5. A composition according to claim 4 in which the aromatic compound is N,N'-bis(β-[p-nitrobenzoyloxy]-ethyl) urea.

6. A composition according to claim 4 in which the compound is the condensation product of p-nitrobenzoyl chloride and the compound derived from the condensation of 3 moles of 3-methyl-6-t-butyl phenol with one mole of crotonaldehyde.

7. A composition according to claim 4 in which the compound is decamethylene glycol di(3,5-dinitrobenzoate).

8. A composition comprising a high molecular weight oxymethylene polymer and 0.05% to 5% by weight of the polymer of an aromatic compound having a molecular weight of at least 220 and containing at least one nitro group attached to a carbon atom of the aromatic nucleus and at least one other monovalent radical attached to another carbon atom of the same aromatic nucleus, where the aromatic nitro compound is selected from the group consisting of those of the formula:

(Nitro-Ar)—NXY in which:

(Nitro-Ar) is a nitrated monovalent benzene radical;
X and Y together with the nitrogen atom form a six-membered heterocyclic ring or X is hydrogen and Y is selected from the group consisting of halogen-substituted phenyl, dipenylamino, N-(benzylideneimino) carbamoyl, N-nitrocarbamoyl, and

—CO—NH—A wherein A is selected from the group consisting of carboxyphenyl, acetylphenyl, nitro-substituted phenyl, halogen-substituted phenyl, secondary alkyl groups of the formula CHR¹R²
wherein R¹ and R² are each alkyl groups containing at least 2 carbon atoms,
and alkylene radicals;
the second valence of which is satisfied with a further group of the formula —NH—CO—NH—(nitro-Ar)

9. A composition according to claim 8 in which the compound is N-2,4-dinitrophenyl-N'-nitrourea.

10. A composition according to claim 8 in which the aromatic compound is N-(α-ethyl-n-butyl)-N'-2,4-dinitrophenylurea.

11. A composition according to claim 8 in which the aromatic compound is benzaldehyde 2,4-dinitrophenyl semicarbazone.

12. A composition comprising a high molecular weight oxymethylene polymer and 0.05% to 5% by weight of the polymer of an aromatic compound having a molecular weight of at least 220 and containing at least one nitro group attached to a carbon atom of the aromatic nucleus and at least one other monovalent radical attached to another carbon atom of the same aromatic nucleus, where the aromatic nitro compound is selected from the group consisting of those of the formula:

(Nitro-Ar)—CH=N—NH—Z in which:

(Nitro-Ar) is a nitrated monovalent radical, and Z is selected from the group consisting of phenyl and carbamoyl.

13. A composition according to claim 12 in which the aromatic compound is a nitrobenzaldehyde phenylhydrazone.

14. A composition according to claim 12 in which the aromatic nitro compound is m-nitrobenzaldehyde semicarbazone.

15. A composition according to claim 12 in which the aromatic nitro compound is p-nitrobenzaldehyde semicarbazone.

References Cited by the Examiner

UNITED STATES PATENTS

| | | | |
|---|---|---|---|
| 2,376,354 | 5/1945 | Gresham | 260—45.9 |
| 2,943,075 | 6/1960 | Schweitzer | 260—45.9 |
| 3,010,939 | 11/1961 | Dinbergs | 260—45.9 |
| 3,025,269 | 3/1962 | Calfee | 260—45.9 |
| 3,079,366 | 2/1963 | Boyle et al. | 260—45.9 |

LEON J. BERCOVITZ, *Primary Examiner.*

DONALD E. CZAJA, *Examiner.*

F. McKELVEY, *Assistant Examiner.*